R. S. Janes,
Saw Mill Appliance.
N° 22,252. Patented Dec. 7, 1858.
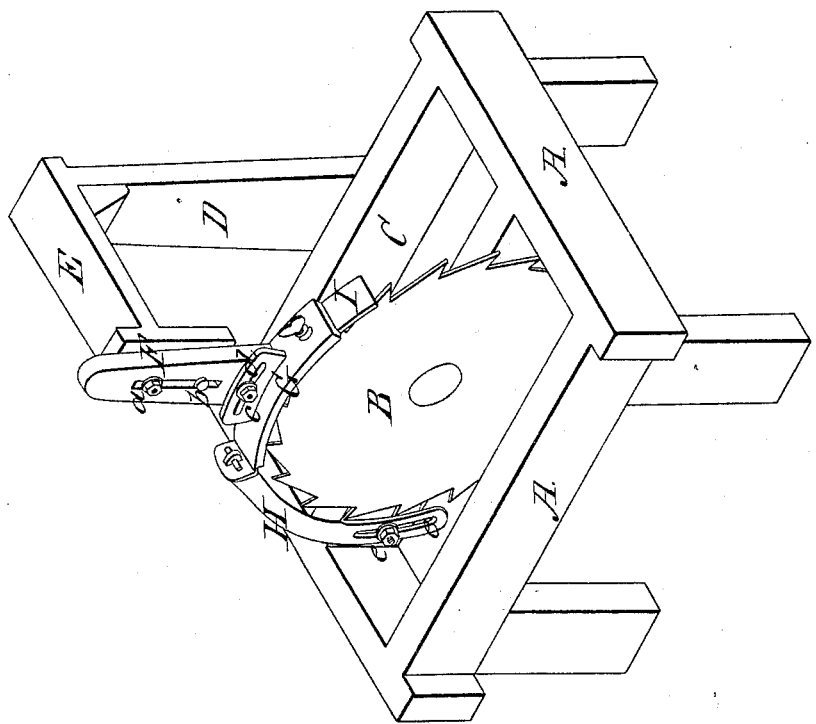
Witnesses
A. E. Tyler
W. G. Benson
Inventor
Reuben S. Janes

UNITED STATES PATENT OFFICE.

REUBEN S. JANES, OF BETHEL, VERMONT.

GUARD FOR CIRCULAR SAWS.

Specification of Letters Patent No. 22,252, dated December 7, 1858.

*To all whom it may concern:*

Be it known that I, R. S. JANES, of Bethel, in the State of Vermont, have invented a new and useful Safety Guard or Shield for Circular Saws; and I do hereby declare that the following is a full and exact description thereof.

The nature of my invention consists in so placing an adjustable shield over the edge of a circular saw as that all that portion of the saw which is above the saw-frame, with the exception of the space occupied by the log in feeding the saw, shall be completely covered, and prevented, not only from receiving but from doing injury to any person who through accident or inadvertence might be exposed to contact therewith.

In the accompanying drawing A is the saw frame; B, is the saw. From the rear cross tie C of the frame rises a standard D, bearing at its upper extremity an arm E which extends horizontally forward until its front end is nearly over the saw. The arm E has two guide pins $a$ and $b$ which extend through a slot in, and govern the direction of, the vertical slide F. The pin $a$ is fitted as a tightening screw to keep the slide F in its place when set. The slide F bears at its lower extremity a pin $c$ also with a tightening screw, which extends through a slot $d$ in a plate on the top of the shield G. The shield G and the slot are curved concentrically with the saw. To one end of the shield G is attached a blade H, which extends down in the same plane and concentric with, the saw below a line passing horizontally through its center, where the blade H is held by means of a slot and pin $e$ with a tightening screw, G, so that it cannot oscillate upon its pin $c$, and likewise acts as a shield over that portion of the saw around which it extends; while it will be in the kerf of the saw as the log progresses and act as an opening wedge to keep the saw free. The shield G is capable of being extended around the saw in the opposite direction from the blade H by means of the tongue I, which slides within the shield as in a sheath, and is secured in position by the set screw $f$. The shield G and blade H are adjustable in two directions—one, concentrically around the saw by means of the curved slots, and pins $c$ and $e$—and the other vertically by means of the slot in the slide F, and the pins $a$ and $b$.

When a very large log is to be sawed, the tongue I is to be shoved entirely within the shield G, and this last, with the blade H revolved on the pins $c$ and $e$ so that the saw may present sufficient length of edge to act on the full thickness of the log. If necessary, the slide F, to which the shield G and blade H are attached by the pin $c$ may be lifted up so as to leave a greater space between the saw and the shield. If very small sticks are to be sawed, then the slide F is let down: the shield G is brought near the saw and is revolved around it so as to be brought near the log; and if necessary the tongue I may be drawn out to make up for deficiency in the length of the shield G, so that the whole of the top half of the saw shall be covered except where the work is passing through.

Having thus described my invention what I claim as new and desire to secure by Letters Patent is:

The shield G, with blade H arranged with or without tongue I, for circular saws operating substantially as described and for the purposes set forth.

REUBEN S. JANES.

Witnesses:
G. E. GRAHAM,
S. T. COY.